United States Patent
Kuboki et al.

(10) Patent No.: US 10,305,270 B2
(45) Date of Patent: May 28, 2019

(54) ELECTRIC WIRE PROTECTING MEMBER-EQUIPPED WIRE HARNESS AND SLIDE WIRING APPARATUS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hideyuki Kuboki, Mie (JP); Hiroki Hirai, Mie (JP); Tomoyuki Sakata, Mie (JP); Makoto Higashikozono, Mie (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/542,313

(22) PCT Filed: Jan. 6, 2016

(86) PCT No.: PCT/JP2016/050190
§ 371 (c)(1),
(2) Date: Jul. 7, 2017

(87) PCT Pub. No.: WO2016/114183
PCT Pub. Date: Jul. 21, 2016

(65) Prior Publication Data
US 2018/0278036 A1    Sep. 27, 2018

(30) Foreign Application Priority Data
Jan. 13, 2015  (JP) .................................. 2015-004173

(51) Int. Cl.
H01B 7/00 (2006.01)
H02G 3/04 (2006.01)
(Continued)

(52) U.S. Cl.
CPC ......... H02G 11/006 (2013.01); B60R 16/027 (2013.01); B60R 16/0215 (2013.01);
(Continued)

(58) Field of Classification Search
None
See application file for complete search history.

(56) References Cited

U.S. PATENT DOCUMENTS 3,752,180 A * 8/1973 Elder ..................... H02G 11/00
137/355.17
4,392,344 A * 7/1983 Gordon ................... F16G 13/16
138/120
(Continued)

FOREIGN PATENT DOCUMENTS

| | | | |
|---|---|---|---|
| JP | H05161232 A | 6/1993 | |
| JP | H09172716 A | 6/1997 | |

(Continued)

OTHER PUBLICATIONS

International Search Report for Application No. PCT/JP2016/050190 dated Mar. 22, 2016, 6 pages.
(Continued)

*Primary Examiner* — Dimary S Lopez Cruz
*Assistant Examiner* — Muhammed Azam
(74) *Attorney, Agent, or Firm* — Reising Ethington, P.C.

(57) ABSTRACT

An electric wire protecting member that includes a belt-shaped base portion that extends in a belt-shape and three or more partition portions that are formed along a direction in which the belt-shaped base portion extends and are provided in parallel to each other at intervals into which the electric
(Continued)

wires can be accommodated in a width direction of the belt-shaped base portion. Slits for dividing the three or more partition portions are formed at least at one location along the width direction of the belt-shaped base portion.

4 Claims, 9 Drawing Sheets

(51) Int. Cl.
*B60R 16/02* (2006.01)
*H02G 11/00* (2006.01)
*B60R 16/027* (2006.01)

(52) U.S. Cl.
CPC ......... *H02G 3/0418* (2013.01); *H02G 3/0475* (2013.01); *H01B 7/0045* (2013.01)

(56) References Cited

U.S. PATENT DOCUMENTS

| | | | | | |
|---|---|---|---|---|---|
| 4,701,154 | A | * | 10/1987 | Rausch | B29D 29/08 474/205 |
| 4,744,010 | A | * | 5/1988 | Witte | H01R 4/2404 174/101 |
| 5,149,017 | A | * | 9/1992 | McEntire | B64F 1/305 14/71.5 |
| 5,322,480 | A | * | 6/1994 | Meier | F16G 13/16 174/97 |
| 5,332,886 | A | * | 7/1994 | Schilling | F24C 7/087 219/413 |
| 5,342,222 | A | * | 8/1994 | Tanaka | H02G 3/0437 439/603 |
| 5,431,981 | A | * | 7/1995 | Tanaka | H02G 3/0437 428/122 |
| 5,577,930 | A | * | 11/1996 | Dahlem | H01R 4/2454 439/399 |
| 5,665,936 | A | * | 9/1997 | Sawamura | H01B 7/0045 174/27 |
| 5,844,169 | A | * | 12/1998 | Uemura | B60R 16/0215 174/68.3 |
| 6,176,735 | B1 | * | 1/2001 | Kawaguchi | B60R 16/0238 439/298 |
| 6,215,068 | B1 | * | 4/2001 | Meier | H02G 11/00 174/68.1 |
| 6,464,181 | B2 | * | 10/2002 | Sakakura | F16L 3/23 24/16 PB |
| 6,528,728 | B1 | * | 3/2003 | Shima | H02G 3/0437 174/101 |
| 6,653,568 | B1 | * | 11/2003 | Davis | H02G 3/0481 174/135 |
| 6,677,526 | B2 | * | 1/2004 | Kishizawa | H02G 3/0481 174/68.1 |
| 6,708,480 | B1 | * | 3/2004 | Wehler | F16G 13/16 248/49 |
| 6,858,797 | B2 | * | 2/2005 | Sheikholeslami | F16G 13/16 174/480 |
| 7,119,275 | B2 | * | 10/2006 | Suzuki | H02G 3/0691 174/503 |
| 7,307,217 | B2 | * | 12/2007 | Daito | B60R 16/0215 138/157 |
| 7,418,812 | B2 | * | 9/2008 | Ikeda | F16G 13/16 248/49 |
| 8,119,913 | B2 | * | 2/2012 | Sonotsu | H02G 3/0608 174/101 |
| 8,188,368 | B2 | * | 5/2012 | Suzuki | B60R 16/0215 174/101 |
| 8,575,487 | B2 | * | 11/2013 | Agusa | H02G 3/0487 174/68.3 |
| 8,950,714 | B2 | * | 2/2015 | Ikeda | H02G 11/006 138/106 |
| 8,987,599 | B2 | * | 3/2015 | Reuss | H02G 11/006 174/113 R |
| 9,404,557 | B2 | * | 8/2016 | Kaihotsu | F16G 13/16 |
| D774,469 | S | * | 12/2016 | Suenaga | D13/156 |
| 9,561,758 | B2 | * | 2/2017 | Wakabayashi | B60R 16/0215 |
| 9,592,775 | B2 | * | 3/2017 | Suzuki | H01B 7/0045 |
| 9,781,868 | B2 | * | 10/2017 | Wakabayashi | H05K 1/0228 |
| 2005/0045357 | A1 | * | 3/2005 | Ichikawa | H02G 3/0431 174/50 |
| 2007/0089895 | A1 | * | 4/2007 | Suzuki | B60R 16/0215 174/72 A |
| 2007/0163795 | A1 | * | 7/2007 | Utaki | F16G 13/16 174/19 |
| 2008/0257440 | A1 | * | 10/2008 | Ikeda | F16G 13/16 138/110 |
| 2009/0211781 | A1 | * | 8/2009 | Suzuki | B60R 16/0215 174/101 |
| 2012/0024561 | A1 | * | 2/2012 | Sekino | B60R 16/0215 174/50 |
| 2015/0180216 | A1 | * | 6/2015 | Suzuki | H02G 3/088 174/70 C |
| 2016/0248235 | A1 | * | 8/2016 | Itou | B60R 16/0215 |

FOREIGN PATENT DOCUMENTS

| | | |
|---|---|---|
| JP | 2006166492 A | 6/2006 |
| JP | 2010193599 A | 9/2010 |
| JP | 2012166640 A | 9/2012 |
| JP | 2013013183 A | 1/2013 |
| WO | WO2013018384 A1 | 2/2013 |

OTHER PUBLICATIONS

International Preliminary Report on Patentability for Application No. PCT/JP2016/050190, 12 pages.

* cited by examiner

ELECTRIC WIRE PROTECTING MEMBER-EQUIPPED WIRE HARNESS AND SLIDE WIRING APPARATUS

CROSS REFERENCE TO RELATED APPLICATIONS

This application claims the priority of Japanese patent application JP2015-004173 filed on Jan. 13, 2015, the entire contents of which are incorporated herein.

TECHNICAL FIELD

The invention relates to a technique for protecting a plurality of electric wires while guiding the electric wires bendably in a certain direction.

BACKGROUND ART

Techniques for protecting electric wires disposed across the floor of an automobile and its seats are disclosed in Patent Documents 1 to 3.

Patent Document 1 (JP2010-193599A) discloses a configuration in which electric wires routed across the floor of an automobile and its seats are accommodated in an accommodation portion for extra length absorption in a state in which the electric wires are accommodated in a corrugated tube.

Patent Document 2 (JP2013-13183A) discloses electric wire protective equipment that includes a plurality of single units each having a base plate and a pair of side walls protruding from both ends of this base plate, and to which the base plate is linked in series. In this electric wire protective equipment, the electric wires are accommodated between the pair of side walls. Patent Document 3 (JP2006-166492A) also discloses protective equipment similar to that disclosed in Patent Document 2.

Patent Document 4 (JP 2012-166640A) discloses a technique in which a flat cable is used as a wire harness routed between a vehicle body and its slide seats.

SUMMARY

However, with the techniques disclosed in Patent Documents 1 to 3, the accommodation of a circular cross-sectional bundle of the plurality of electric wires is a prerequisite for the corrugated tube or the protective equipment. Thus, these techniques are problematic in that the corrugated tube or the protective equipment is thick, and if the corrugated tube or the protective equipment is bent, its radius also tends to be large.

The technique disclosed in Patent Document 4 is problematic in that in order to used the flat cable, it is necessary to change the wiring materials. For example, ordinarily, an electric wire obtained by coating one core wire with a resin through extrusion is used as a wire harness in a vehicle. Thus, in order to use the flat cable in a portion of a wiring path, a configuration for changing the electric wires and the flat cable at both ends, for example, a configuration for connecting a connector or the like is required.

In view of this, an object of the present design is to make it possible to protect a plurality of electric wires while guiding the electric wires bendably in a certain direction, and to bend the electric wires at an angle that is as sharp as possible.

In order to resolve the above-described issue, an electric wire protecting member-equipped wire harness according to a first aspect is an electric wire protecting member for protecting a plurality of electric wires, the electric wire protecting member including a belt-shaped base portion that extends in a belt-shape, three or more partition portions that are formed along a direction in which the belt-shaped base portion extends and are provided in parallel to each other at intervals into which the electric wires can be accommodated in a width direction of the belt-shaped base portion, and a belt-shaped lid portion for covering openings of the three or more partition portions on the side opposite to the belt-shaped base portion, slits for dividing the three or more partition portions being formed at least at one location along the width direction of the belt-shaped base portion, lid slits for dividing the belt-shaped lid portion being formed at positions of the belt-shaped lid portion that correspond to the positions of the slits, and electric wire accommodation slits extending along a direction in which the belt-shaped lid portion extends being formed at central positions between adjacent partition portions in the three or more partition portions of the belt-shaped lid portion, and a plurality of electric wires that are accommodated between the three or more partition portions and are lined up in parallel to each other.

A second aspect is the electric wire protecting member-equipped wire harness according to the first aspect, in which the slits are formed at a plurality of positions in the direction in which the belt-shaped base portion extends.

A fifth aspect is the electric wire protecting member-equipped wire harness according to the first or second aspect, in which the electric wire accommodation slits have a portion whose opening width gradually increases outward.

An eighth aspect is the electric wire protecting member-equipped wire harness according to the first, second, or fifth aspect, in which a minimum width of accommodation spaces between the three or more partition portions is set to be larger than an outer diameter of the electric wires.

A ninth aspect is a slide wiring apparatus for absorbing an extra length of a wire harness routed between a vehicle body and a slide movement member provided in the vehicle body, the slide wiring apparatus including the electric wire protecting member-equipped wire harness according to the first, second, fifth, or eighth aspect in which one end of the electric wire protecting member is fixed to the vehicle body and another end of the electric wire protecting member is fixed to the slide movement member, and a harness accommodation portion for accommodating the electric-wire protecting member-equipped wire harness in a state in which the electric wire protecting member-equipped wire harness is bent into a U-shape with the belt-shaped base portion disposed on its inner circumferential side, in which a U-shaped bending form of the electric wire protecting member-equipped wire harness in the harness accommodation portion is changed as the slide movement member moves.

According to the first, second, fifth, eighth, and ninth aspects, electric wires can be accommodated between three or more partition portions. Also, an electric wire protecting member can be easily bent in a direction in which slits formed in the three or more partition portions open up. Thus, it is possible to protect a plurality of electric wires while guiding the electric wires bendably in a certain direction. Also, by accommodating the plurality of electric wires between three or more partition portions, the electric wires can be kept in a state in which the electric wires are flatly lined up. Thus, the electric wires can be easily bent in one direction orthogonal to a direction in which slits formed in the three or more partition portions open up, that is, a direction orthogonal to the direction in which the plurality of electric wires are flatly lined up. Therefore, the plurality of electric wires that are flatly lined up can be bent at an angle that is as sharp as possible.

According to the second aspect, the electric wire protecting member can be gradually bent at the plurality of slits. Thus, the electric wire protecting member can be bent with a relatively small bending radius.

According to the first aspect, the electric wires accommodated between the three or more partition portions can be protected and kept accommodated by the belt-shaped lid portion.

According to the first aspect, the electric wires can be easily accommodated between the three or more partition portions.

According to the fifth aspect, when electric wires are pressed against electric wire accommodation slits, the electric wire accommodation slits easily open up. Thus, the electric wires can be easily accommodated between the three or more partition portions.

According to the first aspect, the plurality of electric wires can be accommodated in a flatter state, and the plurality of electric wires that are flatly lined up can be bent at a sharper angle.

According to the eighth aspect, the electric wires easily move between partition portions. Therefore, an electric wire protecting member-equipped wire harness can be bent smoothly.

According to the ninth aspect, an extra length of the electric wire protecting member-equipped wire harness can be absorbed by changing a U-shaped bending form of the electric wire protecting member-equipped wire harness in the harness accommodation portion, as the slide movement member moves.

DESCRIPTION OF EMBODIMENTS

Hereinafter, an electric wire protecting member, an electric wire protecting member-equipped wire harness, and a slide wiring apparatus according to embodiments will be described.

Figure 1:
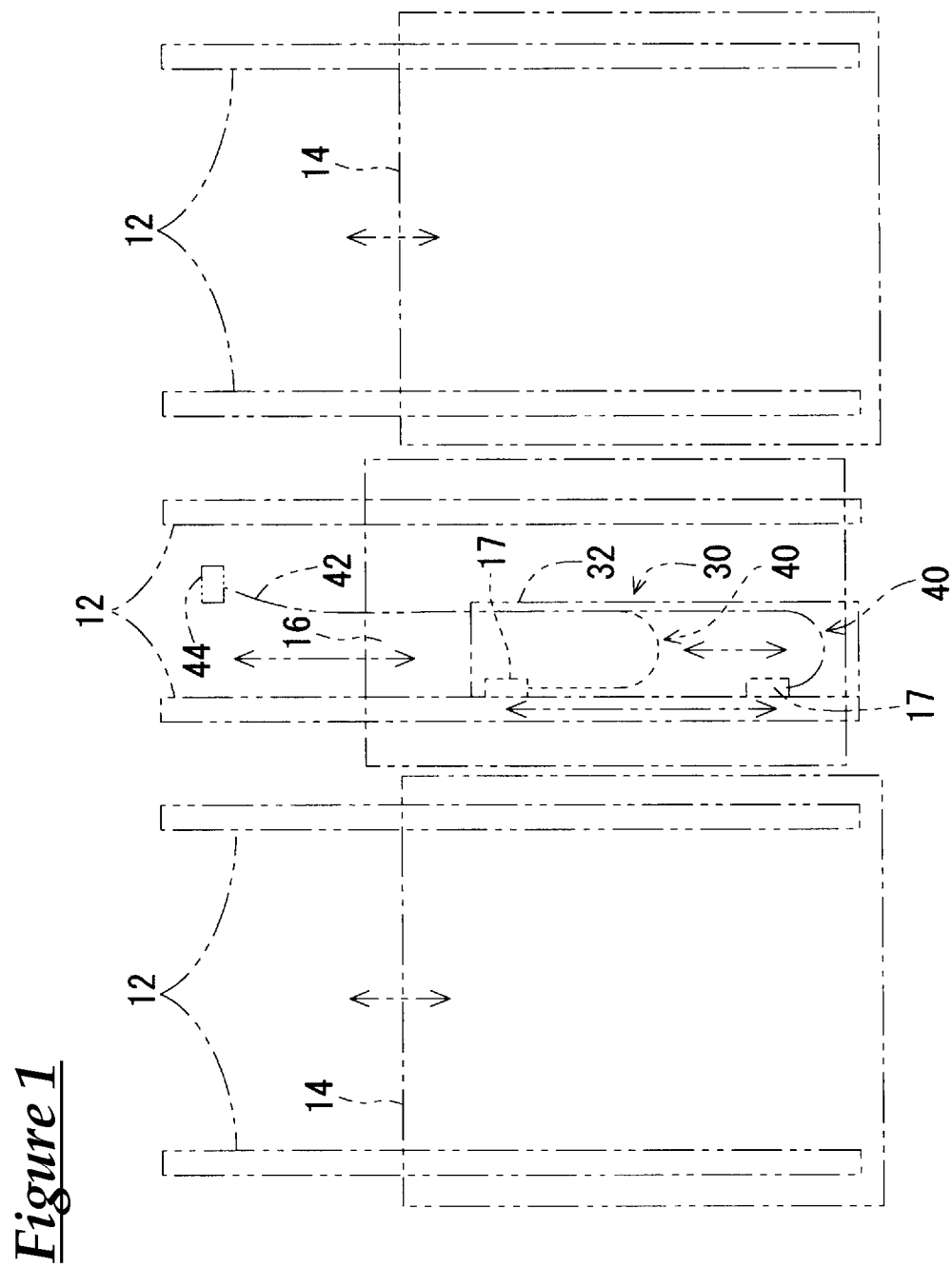
FIG. 1 is a schematic plan view showing a state in which a slide wiring apparatus is incorporated into a slide movement member (slidingly moving member) into which it is supposed to be incorporated.
Figure 2:
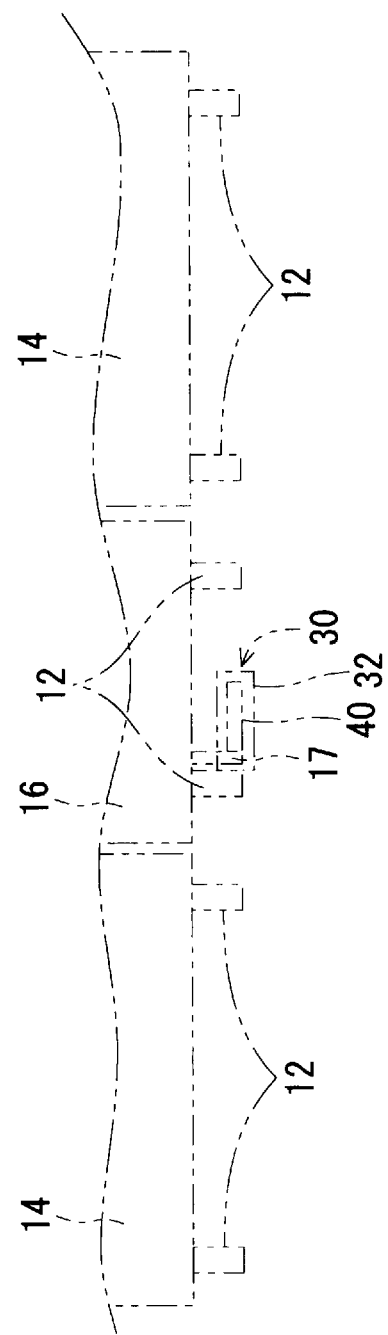
FIG. 2 is a schematic front view showing a state in which the slide wiring apparatus is incorporated into the slide movement member into which it is supposed to be incorporated.

FIG. 1 a schematic plan view showing a state in which a slide wiring apparatus 30 is incorporated into a slide movement member into which it is supposed to be incorporated, and FIG. 2 is a schematic front view showing a state in which the slide wiring apparatus 30 is incorporated into a slide movement member 16 into which it is supposed to be incorporated.

Three pairs of rails 12 are incorporated into a floor 10 of a vehicle along a front-rear direction of the vehicle. Two left and right pairs of rails 12 in the vehicle support two left and right seats 14 and 14 in the vehicle (for example, a driving seat and a passenger seat), the two seats 14 and 14 being movable in the front-rear direction of the vehicle. Also, a central pair of rails 12 (central with respect to the width direction) of the vehicle supports the slide movement member 16 (for example, a center seat or a center console) between the two seats 14 and 14, the slide movement member 16 being movable. The seats 14 and 14 and the slide movement member 16 are provided with various electric parts such as various sensors (e.g., seating sensors) and various driving sources (e.g., motors) for changing their orientations. Also, the vehicle is provided with an electronic control unit for transmitting/receiving signals to/from the above-described electric parts or various electric parts such as power sources for supplying power. Thus, it is necessary to incorporate a wiring apparatus for connecting various electric parts and the seats 14 and 14 of the vehicle body and various electric parts of the slide movement member 16.

Also, if multiple pairs (three pairs herein) of rails 12 are disposed on the floor 10, the intervals between the rails 12 decrease, and the slide wiring apparatus 30 needs to be incorporated into these small intervals. The slide wiring apparatus 30 according to the present embodiment has a configuration that is suitable to be incorporated into such a narrow space.

Although the following description focuses on the slide wiring apparatus 30 for connecting various electric parts of the vehicle and various electric parts of the slide movement member 16, a slide wiring apparatus having a configuration similar to that of this slide wiring apparatus 30 or having another configuration may also be incorporated in the seat 14.

As described above, the slide movement member 16 is supported movably in the front-rear direction of the vehicle by the central pair of rails 12. Because the other rails 12 are provided just near the outside of the central pair of rails 12, it is difficult to ensure a sufficient space for incorporating the slide wiring apparatus 30 outside the central pair of rails 12. In view of this, herein, the slide wiring apparatus 30 is incorporated between the central pair of rails 12. Of course, if a suitable space can be ensured, the slide wiring apparatus 30 may also be incorporated outside the central pair of rails 12.

The slide wiring apparatus 30 absorbs an extra length of an electric wire protecting member-equipped wire harness 40 (electric wires 42) routed between the vehicle and the slide movement member 16, and includes the electric wire protecting member-equipped wire harness 40 and a harness accommodation portion 32.

The harness accommodation portion 32 is made of a resin or the like, and is fixed in a position adjacent to one of the rails 12 between the pair of rails 12. This harness accommodation portion 32 is capable of accommodating the electric wire protecting member-equipped wire harness 40 in a state in which the electric wire protecting member-equipped wire harness 40 is bent into a U-shape.

The electric wire protecting member-equipped wire harness 40 includes a wire harness including a plurality of electric wires and an electric wire protecting member (which will be described in detail later).

One end of the electric wire protecting member-equipped wire harness 40 is fixed to the vehicle and is connected to an electric part provided in the vehicle. The other end of the electric wire protecting member-equipped wire harness 40 is fixed to the slide movement member 16, and is supported so that it can be moved together with the slide movement member 16. Also, the other end of the electric wire protecting member-equipped wire harness 40 is connected to the electric part provided in the slide movement member 16.

A middle portion in the direction in which this electric wire protecting member-equipped wire harness 40 extends is accommodated in the harness accommodation portion 32 in a state in which the middle portion is bent into a U-shape. Thus, when the slide movement member 16 moves in the front-rear direction of the vehicle, the variable extra length, which changes as the slide movement member 16 moves, of the electric wire protecting member-equipped wire harness 40 is absorbed by changing the U-shaped bending form of the electric wire protecting member-equipped wire harness 40 in the harness accommodation portion 32 as the slide movement member 16 moves.

Figure 3:
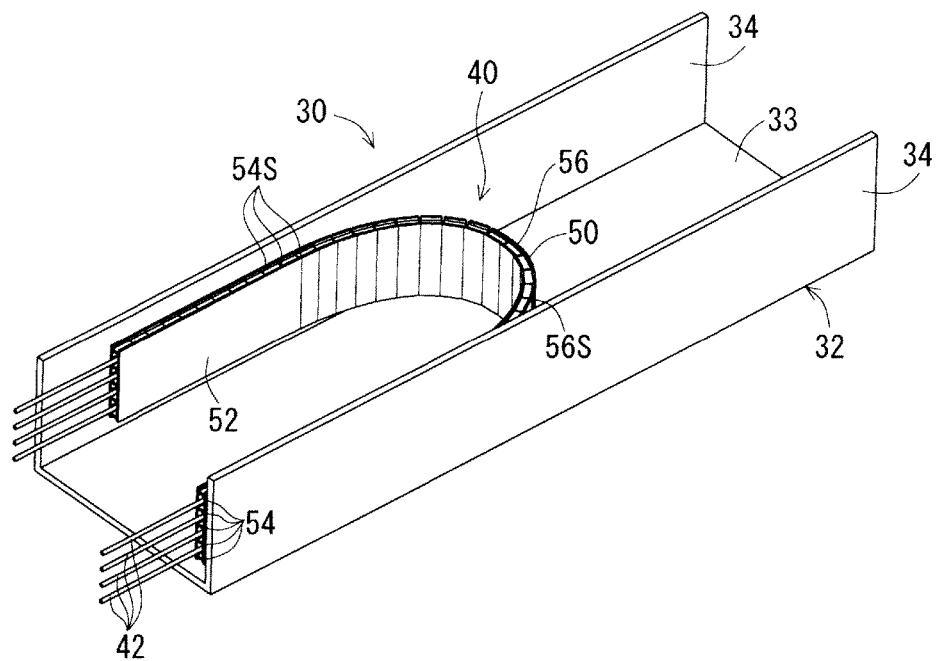
FIG. 3 shows a perspective view of the slide wiring apparatus.
Figure 4:
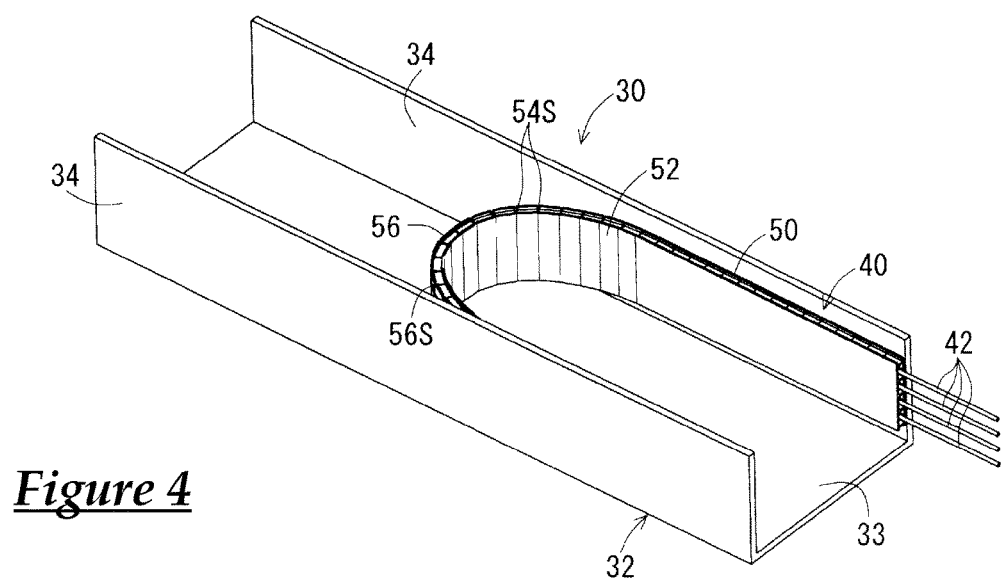
FIG. 4 shows a perspective view of the slide wiring apparatus.
Figure 5:
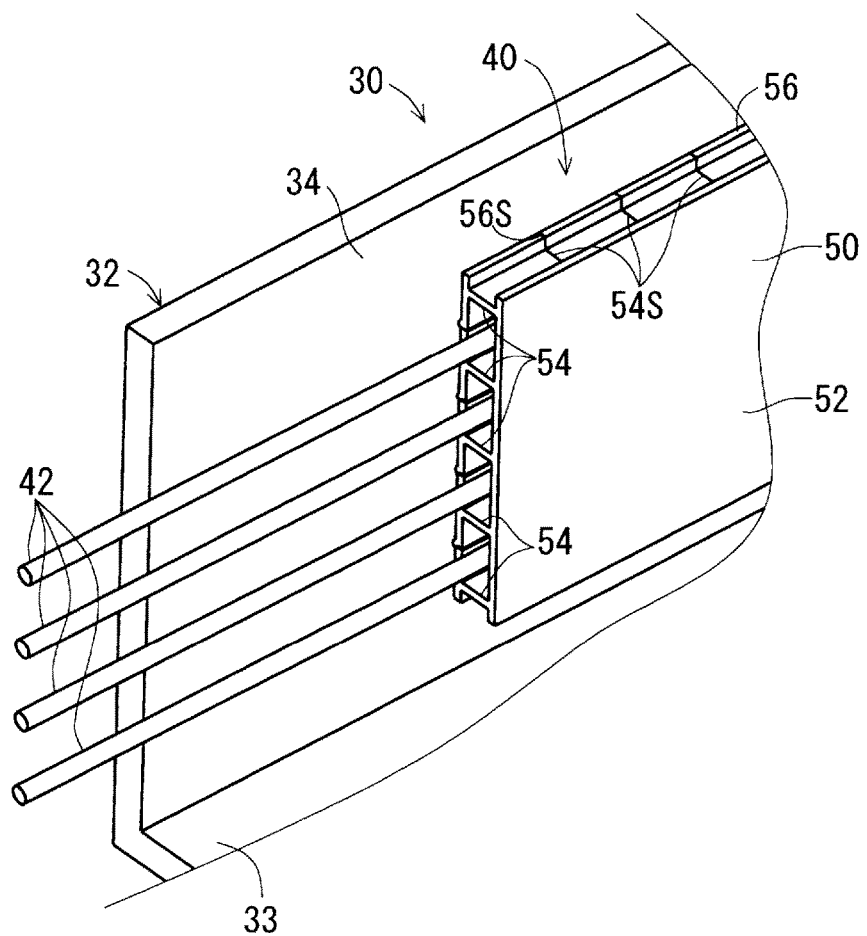
FIG. 5 shows an enlarged view of a portion in FIG. 3.
Figure 6:
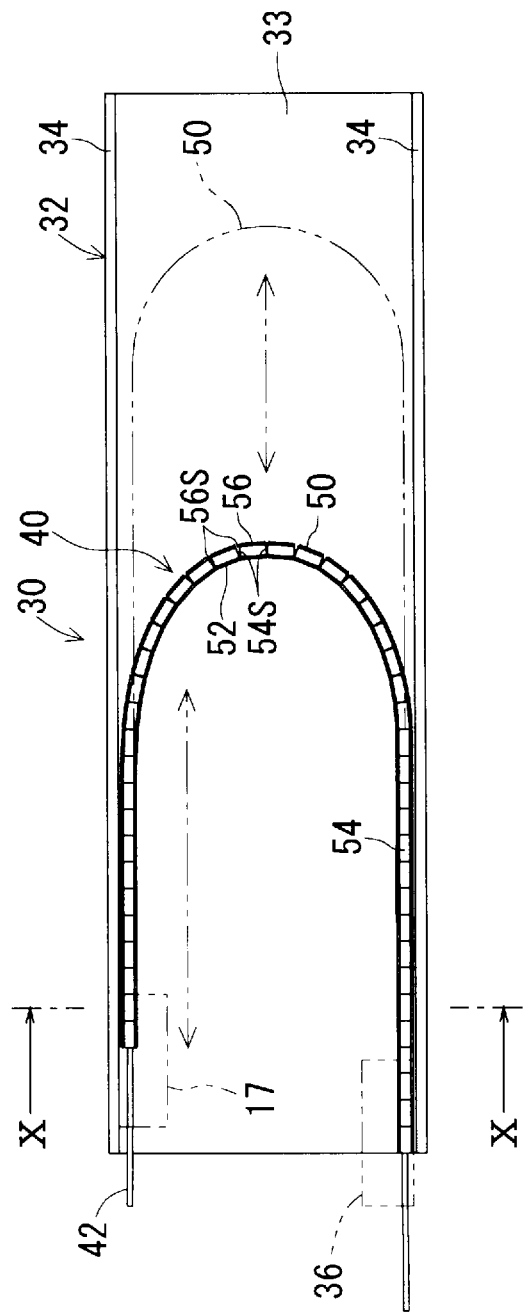
FIG. 6 shows a plan view of the slide wiring apparatus.
Figure 7:
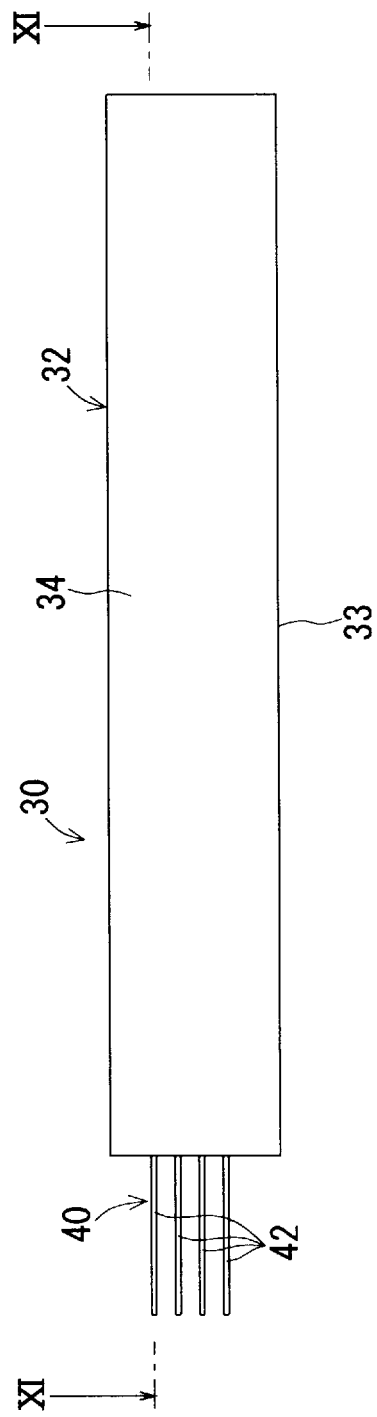
FIG. 7 shows a side view of the slide wiring apparatus.
Figure 8:
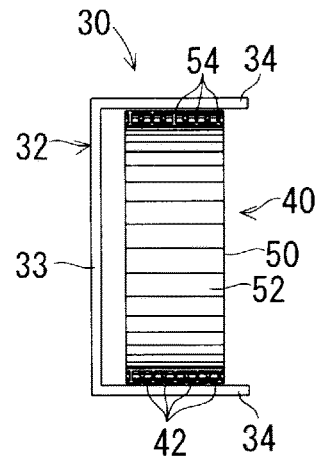
FIG. 8 shows a front view of the slide wiring apparatus.
Figure 9:
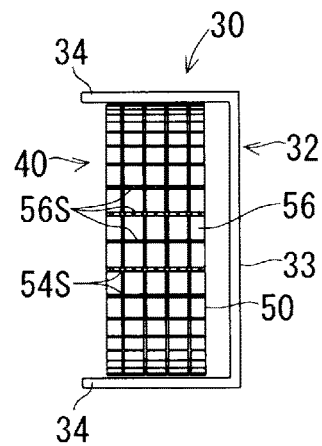
FIG. 9 shows a rear view of the slide wiring apparatus.
Figure 10:
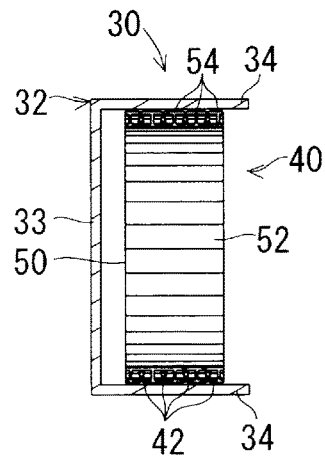
FIG. 10 is a cross-sectional view taken along line X-X in FIG. 6.
Figure 11:
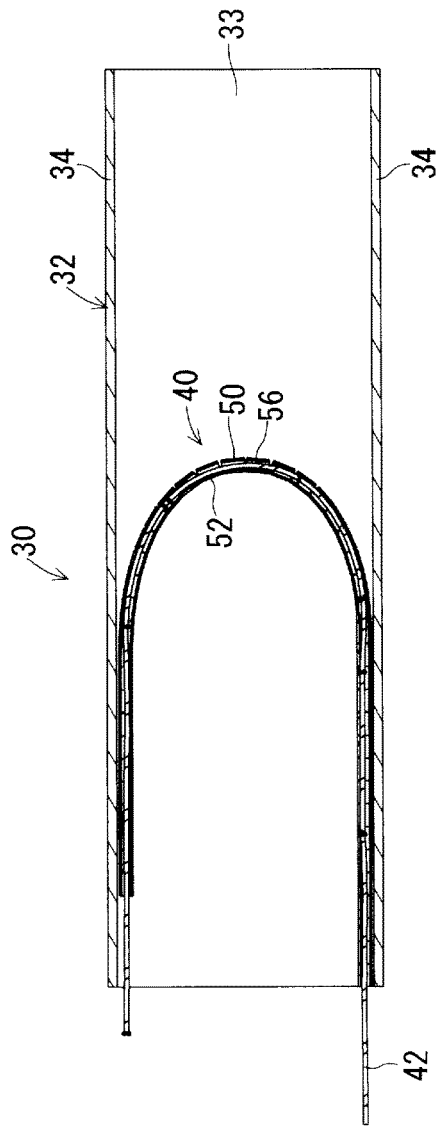
FIG. 11 is a cross-sectional view taken along line XI-XI in FIG. 7.
Figure 12:
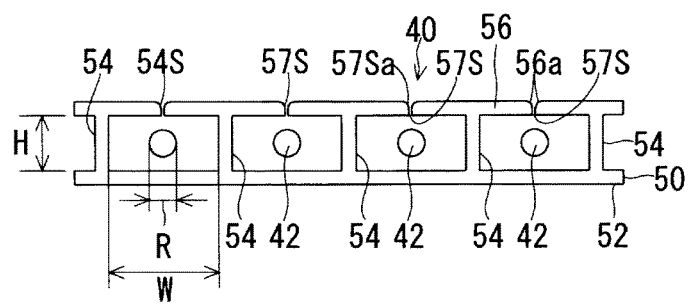
FIG. 12 is a front view of an electric wire protecting member-equipped wire harness.

The slide wiring apparatus 30 will be described more specifically below. FIGS. 3 and 4 show perspective views of the slide wiring apparatus 30, FIG. 5 shows an enlarged view of a portion in FIG. 3, FIG. 6 shows a plan view of the slide wiring apparatus 30, FIG. 7 shows a side view of the slide wiring apparatus 30, FIG. 8 shows a front view of the slide wiring apparatus 30, and FIG. 9 shows a rear view of the slide wiring apparatus 30. FIG. 10 shows a cross-sectional view taken along line X-X in FIG. 6, and FIG. 11 shows a cross-sectional view taken along line XI-XI in FIG. 7. FIG. 12 is a front view of the electric wire protecting member-equipped wire harness 40.

The slide wiring apparatus 30 includes the electric wire protecting member-equipped wire harness 40 and the harness accommodation portion 32.

The harness accommodation portion 32 is made of a resin or the like with a metal mold, and includes a bottom plate portion 33 and a pair of side wall portions 34. The bottom plate portion 33 is formed into a narrow elongated rectangular shape. The pair of side walls 34 extend orthogonally from the main surface of the bottom plate portion 33 on both sides of the bottom plate portion 33. Thus, the pair of side walls 34 are disposed in parallel to each other at an interval.

The harness accommodation portion 32 is fixed at a position adjacent to one of the rails 12 between the pair of rails 12. In this state, one of the side walls 34 is disposed at a position separate from one of the rails 12, and the other rail 12 is disposed at a portion adjacent to that rail 12.

Moreover, one end of the electric wire protecting member 50 in the electric wire protecting member-equipped wire harness 40 is fixed to one of the side walls 34. Herein, one end of the electric wire protecting member 50 is fixed via a fixing member 36. The fixing member 36 is fixed to one of the side walls 34 with a screwing structure, locking structure, or the like, in a state in which the fixing member 36 holds one end of the electric wire protecting member 50 by clamping the one end. A configuration may also be adopted in which one of the side walls 34 partially extends outward, and the one end of the electric wire protecting member 50 and the portion of the one of the side walls 34 that extends outward are bundled and fixed with a clamping band or an adhesive tape as the fixing member. A configuration may also be adopted in which one end of the electric wire protecting member 50 is fixed by a locking portion or the like formed on one of the side walls 34.

Note that a plurality of electric wires 42 extend from one end of the electric wire protecting member 50, and a connector 44 is connected to their ends. This connector 44 is connected to various electric parts provided in the vehicle.

Also, the other end of the electric wire protecting member 50 in the electric wire protecting member-equipped wire harness 40 is fixed to the slide movement member 16. Herein, the slide movement member 16 has a harness support extension portion 17 that extends downward at a position that is inward of one of the rails 12 (see FIGS. 1, 2, and 6). This harness support extension portion 17 moves along the inner side of the above-described other side wall 34 in the harness accommodation portion 32, together with the movement of the slide movement member 16. The other end of the electric wire protecting member 50 is fixed to this harness support extension portion 17. This fixing can be achieved with a screwing structure, a locking structure, or a clamping structure using a clamping band, an adhesive tape, or the like, for example. The harness support extension portion 17 and the other end of the electric wire protecting member 50 move along the inner side of the above-described other side wall 34, as the slide movement member 16 moves.

Note that the plurality of electric wires 42 extend from the other end of the electric wire protecting member 50, and retract into the slide movement member 16 via the harness support extension portion 17. The plurality of electric wires 42 are then directly connected to various electric parts provided in the slide movement member 16, or are connected thereto through connectors or the like.

The electric wire protecting member-equipped wire harness 40 includes the plurality of electric wires 42 and the electric wire protecting member 50.

The electric wires 42 are obtained by forming an insulating coating around their core wires. The core wires are wire members made of copper, a copper alloy, aluminum, an aluminum alloy, or the like. The core wires may also be obtained by twisting a plurality of wires or be constituted by a single-core wire. The insulating coating is made of a resin or the like, and covers each core wire. Ordinarily, the insulating coating is formed by coating a core wire through extrusion, and its outer circumferential portion has a circular cross-section. Such electric wires 42 are often used as electric wires for an ordinary wire harness. Therefore, after the electric wires 42 extend from the electric wire protecting member 50, the electric wires 42 can be easily routed in the vehicle similarly to an ordinary wire harness, and the type of wiring material needs not to be changed before and after this electric wire protecting member 50. Herein, the electric wire protecting member-equipped wire harness 40 includes four electric wires 42 having such a configuration.

The electric wire protecting member 50 is capable of protecting the plurality of electric wires 42.

Herein, the electric wire protecting member 50 is made of a resin or the like and includes a belt-shaped base portion 52, three or more partition portions 54, and a belt-shaped lid portion 56.

The belt-shaped base portion 52 extends in a belt-shape. The width of the belt-shaped base portion 52 is set to be larger than the total of four diameters of the plurality of electric wires 42 that are to be protected. Also, the length of the belt-shaped base portion 52 is set to be larger than a slide movement amount of the slide movement member 16.

Five partition portions 54 are provided here as the three or more partition portions 54. The partition portions 54 are formed on one main surface (an inward-facing surface) of the belt-shaped base portion 52 along the direction in which the belt-shaped base portion 52 extends. The partition portions 54 are provided in parallel to each other at intervals in which the electric wires 42 can be accommodated in the width direction of the belt-shaped base portion 52. The partition portions 54 extend perpendicularly to the belt-shaped base portion 52, and partition a space on the side of one main surface of the belt-shaped base portion 52 in its width direction. Moreover, spaces that can accommodate the electric wires 42 are formed between partition portions 54 by the three or more (five herein) partition portions 54. That is, (n−1) spaces that can accommodate the electric wires 42 can be formed by n (n indicates an integer of three or more) partition portions 54.

The belt-shaped lid portion 56 covers openings between partition portions 54 on the side opposite to the belt-shaped base portion 52. Herein, the belt-shaped base portion 52 has the same size and shape as the above-described belt-shaped base portion 52, and extends in a belt-shape. Moreover, front edges of the partition portions 54 are connected to one main surface (inward-facing surface) of the belt-shaped base portion 52. Accordingly, the spaces for accommodating the electric wires 42 between partition portions 54 are each surrounded by the partition portions 54 on their both sides, the belt-shaped base portion 52, and the belt-shaped lid portion 56.

The minimum size of the spaces for accommodating the electric wires 42 between partition portions 54 is preferably larger than an outer diameter of the electric wires 42. For example, when the outer diameter of the electric wires 42 is R, the interval between adjacent partition portions 54 is W, and the interval between the belt-shaped base portion 52 and the belt-shaped lid portion 56 is H (see FIG. 12), then both W and H are preferably set to be larger than R. Accordingly, the electric wires 42 easily move relatively freely in their accommodation spaces along their extension direction.

In this electric wire protecting member 50, slits 54S for dividing the partition portions 54 at least at one location are formed along the width direction of the belt-shaped base portion 52, and lid slits 56S for dividing the belt-shaped lid portion 56 are formed at positions corresponding to those of the slits 54S. Also, such slits 54S and lid slits 56S are formed at a plurality of positions at intervals in the direction in which the electric wire protecting member 50 extends. Herein, such slits 54S and lid slits 56S are formed at equal intervals in the direction in which the electric wire protecting member 50 extends, but they need not necessarily to be formed in this manner, and they may also be formed in a portion at which the electric wire protecting member 50 needs to be bent at a bending radius that is as small as possible at narrower intervals compared to the other portions, for example.

The above-described slits 54S extend from a front end of the partition portion 54 to its base end along the direction perpendicular to the belt-shaped base portion 52. Of course, the slits may also be formed from the front end of the partition portion 54 to a portion located in front of the base end.

The lid slits 56S are formed over the entirety of the belt-shaped base portion 52 extending in its width direction along the direction perpendicular to the partition portions 54. The slits 54S formed in the partition portions 54 and the lid slits 56S formed in the belt-shaped lid portion 56 communicate with each other, and the electric wire protecting member 50 can be easily bent with the belt-shaped base portion 52 located on the inner circumferential side such that the slits 54S and the lid slits 56S open up. On the other hand, if the electric wire protecting member 50 is bent on the opposite side, portions of the partition portions 54 that flank the slits 54S come into contact with each other, and portions of the belt-shaped lid portion 56 that flank the lid slits 56S come into contact with each other. Thus, it is difficult to bend the electric wire protecting member 50 with the belt-shaped lid portion 56 located on the inner circumferential side. Also, the electric wire protecting member 50 has a belt-shape, and thus it is difficult to bend it toward its two sides in its width direction. Therefore, it can be said that easy bending of this electric wire protecting member 50 is restricted to only one side in its thickness direction (the bending direction, with the belt-shaped base portion 52 located on the inner circumferential side), and the electric wire protecting member 50 is not easily bent in any other directions.

Also, electric wire accommodation slits 57S that extend along the direction in which the belt-shaped lid portion 56 extends are formed in portions located between partition portions 54 of the belt-shaped lid portion 56. Herein, the electric wire accommodation slits 57S are formed at central positions of the partition portions 54. The opening width of the electric wire accommodation slit 57S is smaller than the outer diameter R of the electric wire 42. Thus, when the electric wires 42 are pressed against the portions of the belt-shaped lid portion 56 that are provided with the electric wire accommodation slits 57S, the belt-shaped lid portion 56 undergoes elastic deformation such that the electric wire accommodation slits 57S open up. Accordingly, the electric wires 42 can be easily accommodated in electric wire accommodation spaces between partition portions 54 through the electric wire accommodation slits 57S. Also, after the electric wires 42 pass through the electric wire accommodation slits 57S, the belt-shaped lid portion 56 returns to its original shape, and the opening width of the electric wire accommodation slit 57S becomes smaller than the outer diameter R of the electric wires 42. Therefore, the electric wires 42 are kept in a state in which the electric wires 42 are accommodated in the accommodation spaces between the partition portions 54.

The electric wire accommodation slits 57S preferably have a portion whose opening width gradually increases outward. In the belt-shaped lid portion 56, outer edges 56a of portions that flank the electric wire accommodation slits 57S are inclined outward (the side opposite to the accommodation spaces), and outer portions of the electric wire accommodation slits 57S are formed in portions 57Sa whose opening width gradually increases outward. Thus, when the electric wires 42 are pressed against the portions of the belt-shaped lid portion 56 that are provided with the electric wire accommodation slits 57S, the electric wire accommodation slits 57S can open up easily. Also, there is the advantage that the electric wires 42 are not easily damaged when the electric wires 42 are pressed against the portions of the belt-shaped lid portion 56 that are provided with the electric wire accommodation slits 57S.

Such an electric wire protecting member 50 can be formed using a hollow plate material provided with a plurality of partition portions 54 that are lined up in parallel to each other, between two plate-shaped portions (the belt-shaped base portion 52 and the belt-shaped lid portion 56), for example a plate material also referred to as "plastic cardboard", by forming the above-described slits 54S, lid slits 56S, and electric wire accommodation slits 57S in this plate material by stamping. Note that the hollow plate material can be manufactured by continuously extruding the hollow plate material with an extruder for extruding a resin from an extrusion nozzle corresponding to the ladder-shaped cross-section given by the belt-shaped base portion 52, the belt-shaped lid portion 56, and the plurality of partition portions 54 that are lined up in parallel to each other.

The plurality of electric wires 42 are accommodated in the above-described electric wire protecting member 50 as follows.

That is, the plurality of electric wires 42 are accommodated in accommodation spaces between partition portions 54 and are lined up in parallel to each other. Only one of the electric wires 42 may be accommodated or a plurality of the electric wires 42 may also be accommodated in each of the accommodation portions between partition portions 54. In any case, the plurality of electric wires 42 are accommodated in a state in which the electric wires 42 are distributed in a plurality of accommodation spaces that are lined up in parallel to each other, and thereby they are kept lined up in parallel to each other. Thus, the plurality of electric wires 42 are held in a flat arrangement state, and are easily bent at a relatively small bending radius in their thickness direction.

Here, the electric wires 42 are accommodated one by one in a plurality of accommodation spaces between partition portions 54. Thus, the plurality of electric wires 42 are kept in a state in which the electric wires 42 are lined up in parallel to each other at substantial equal intervals. Therefore, the plurality of electric wires 42 can be kept in a thinner flat state, and can be easily bent at a smaller bending radius in their thickness direction.

The electric wire protecting member-equipped wire harness 40 is accommodated in the harness accommodation portion 32 as follows.

That is, one end of the electric wire protecting member 50 is fixed to one of the side walls 34 of the harness accommodation portion 32, and the other end of the electric wire protecting member 50 is fixed to the harness support extension portion 17 and is supported movably inside the other side wall 34.

In accordance with the position of the slide movement member 16, in a state in which the harness support extension portion 17 is located on one end of a region in which the harness support extension portion 17 moves linearly (for example, a position near the one end of the electric wire protecting member 50 that is fixed thereto, see the electric wire protecting member-equipped wire harness 40 drawn with dotted lines in FIG. 1 and the electric wire protecting member 50 drawn with solid lines in FIG. 6), the central portion in the direction in which the electric wire protecting member 50 extends has a U-shape between a pair of the side walls 34, both ends of the electric wire protecting member 50 have substantially the same length, and the electric wire protecting member 50 extends from both ends of a portion that bends in a U-shape, along the inner surfaces of the pair of side walls 34. In this state, the belt-shaped base portion 52 is oriented on its inner circumferential side, and the belt-shaped lid portion 56 is oriented on its outer circumferential side. Thus, the electric wire protecting member 50 can be easily bent such that the slits 54S and the lid slits 56S open up. Also, the slits 54S and the lid slits 56S are formed at a plurality of positions in the direction in which the electric wire protecting member 50 extends, and thus the position of the portion in the electric wire protecting member 50 that bends in a U-shape can be easily changed by changing the positions at which the slits 54S and the lid slits 56S open up.

In this state, when the harness support extension portion 17 moves along the inner surface of the other side wall 34, the electric wire protecting member 50 absorbs a change in the extra length of the electric wire protecting member-equipped wire harness 40 by changing the position of the portion that bends in a U-shape. For example, when the harness support extension portion 17 moves toward the portion of the electric wire protecting member 50 that bends into a U-shape, the electric wire protecting member 50 bends into a U-shape at a position near the other end on the side of the harness support extension portion 17, and thus has a J-shape in which the linear extension portion is longer at the one end, which is the fixed end (see the electric wire protecting member-equipped wire harness 40 drawn with chain-double dashed lines in FIG. 1, and the electric wire protecting member 50 drawn with chain-double dashed lines in FIG. 6). Also, for example, in contrast to the above description, when the harness support extension portion 17 moves away from the portion of the electric wire protecting member 50 that bends into a U-shape, the electric wire protecting member 50 bends into a U-shape at a position near the one end on the side of the fixing member 36, and has a J-shape in which the liner extension portion is longer at the other end on the side of the harness support extension portion 17.

In this manner, the electric wire protecting member-equipped wire harness 40 is accommodated in the harness accommodation portion 32 in a state in which the electric wire protecting member-equipped wire harness 40 is bent into a U-shape with the belt-shaped lid portion 56 disposed on the inner circumferential side, and the variable extra length of the electric wire protecting member-equipped wire harness 40 can be absorbed by changing the U-shaped bending form of the electric wire protecting member-equipped wire harness 40 in the harness accommodation portion 32 as the slide movement member 16 moves.

According to the electric wire protecting member 50, the electric wire protecting member-equipped wire harness 40, and the slide wiring apparatus 30 having the above-described configuration, the electric wire protecting member 50 can be easily bent in a direction in which the slits 54S formed in the partition portions 54 and the lid slits 56S formed in the belt-shaped lid portion 56 open up. Thus, it is possible to protect the plurality of electric wires 42 while guiding the electric wires bendably in a certain direction. Also, the plurality of electric wires 42 can be kept in a state in which the electric wires 42 are flatly lined up, by accommodating the electric wires 42 between three or more partition portions 54. In this respect as well, the electric wire protecting member-equipped wire harness 40 can be easily bent in one direction orthogonal to a direction in which the plurality of electric wires 42 are flatly lined up, that is, in a direction in which the slits 54S and the lid slits 56S open up. Therefore, the plurality of electric wires 42 that are flatly lined up can be bent at an angle that is as sharp as possible.

Also, a plurality of the slits 54S and the lid slits 56S are formed at intervals in the direction in which the electric wire protecting member 50 extends. Thus, the electric wire protecting member 50 can be sequentially bent at the plurality of positions in the direction in which the electric wire protecting member 50 extends such that the slits 54S and the lid slits 56S open up. Thus, the electric wire protecting member 50 can be bent at a relatively small bending radius.

Also, the electric wires 42 accommodated between partition portions 54 can be protected and kept accommodated by the belt-shaped lid portion 56.

Also, the electric wires 42 can be easily accommodated between partition portions 54 by the electric wire accommodation slits 57S formed in the belt-shaped lid portion 56.

Also, the electric wire accommodation slit 57S has a portion whose width gradually increases outward, and thus when the electric wires 42 are pressed against the electric wire accommodation slits 57S, the electric wire accommodation slits 57S open up easily. Therefore, the electric wires 42 can be easily accommodated between partition portions 54.

Also, because the electric wires 42 are accommodated one by one in accommodation spaces between partition portions 54, the plurality of electric wires 42 can be kept in a state in which the electric wires 42 are flatly lined up in parallel to each other. Therefore, the plurality of electric wires 42 that are flatly lined up can be bent at a sharper angle.

Also, the minimum width of the accommodation spaces between partition portions 54 is set to be larger than the outer diameter R of the electric wires 42, and thus the electric wires 42 easily move between partition portions 54 along the direction in which they extend. When the electric wire protecting member-equipped wire harness 40 is bent, the electric wire protecting member 50 and the electric wires 42 may move differently along the directions in which they extend, and thus by allowing the electric wires 42 to easily move between partition portions 54 along the direction in which the electric wires 42 extend, the electric wire protecting member-equipped wire harness 40 can be smoothly bent.

Also, according to the slide wiring apparatus 30 using the above-described electric wire protecting member-equipped wire harness 40, the extra length of the electric wire protecting member-equipped wire harness 40 can be easily absorbed by changing a U-shaped bending form of the electric wire protecting member-equipped wire harness 40 in the harness accommodation portion 32 as the slide movement member 16 moves. Thus, at this time, the electric wire protecting member-equipped wire harness 40 can be bent at a relatively small bending radius, and thus the size of the slide wiring apparatus 30 can be reduced, in particular, its width can be reduced.

Modifications

Figure 13:
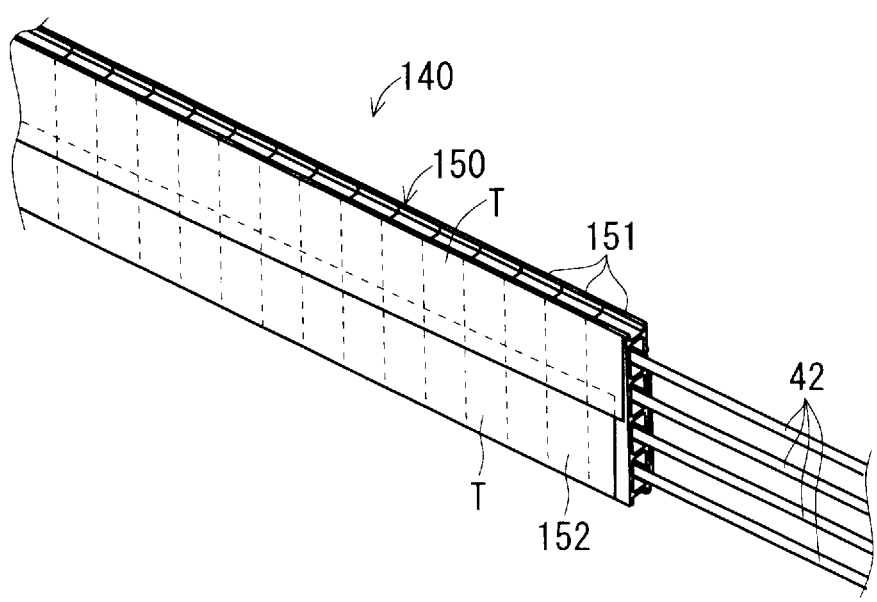
FIG. 13 is a perspective view of a portion of the electric wire protecting member-equipped wire harness according to a modification.

In the above-described embodiment, the belt-shaped base portion 52 is in a linked state from the beginning and thus shaped as one belt, but it does not necessarily need to be in such a state. For example, as an electric wire protecting member 150 of an electric wire protecting member-equipped wire harness 140 shown in FIG. 13, a configuration may also be adopted in which a plurality of separate protecting members 151 obtained by cutting the above-described hollow plate material are prepared, and the plurality of separate protecting members 151 are connected linearly by arranging the plurality of separate protecting members 151 along a line, and attaching adhesive tapes T to the outer surfaces of plate-shaped portions on one side of the arranged separate protecting members 151. In this case, the adhesive tapes T and the plate-shaped portions on the one side of the plurality of separate protecting members 151 that are linked by the adhesive tapes T into a belt-shape serve as a belt-shaped base portion 152 corresponding to the belt-shaped base portion 52.

Similarly to the above-described embodiment, slits 54S and lid slits 56S are formed between the separate protecting members 151 by the electric wire protecting member 150 according to this modification, and thus an electric wire protecting member can be easily bent such that the slits 54S and the lid slits 56S open up with the belt-shaped base portion 152 disposed on the inner circumferential side.

Also, although in the above-described embodiment, the slits 54S and the lid slits 56S are formed at a plurality of positions in the direction in which the electric wire protecting member 50 extends, these slits 54S and the lid slits 56S may also be formed at only one position of the plurality of positions in the direction in which the electric wire protecting member 50 extends. In this case as well, an electric wire protecting member can be easily bent in one direction in the portions provided with these slits 54S and lid slits 56S.

Also, in the above-described embodiment, the electric wire accommodation slits 57S formed in the belt-shaped lid portion 56 may be omitted. In this case, for example, the electric wires 42 can be accommodated between partition portions 54 by inserting the electric wires 42 from one end opening to the other end opening between partition portions 54.

Also, in the above-described embodiment, the belt-shaped lid portion 56 may be omitted. In this case, for example, the electric wires 42 need only to be prevented from escaping from partition portions 54 by winding an adhesive tape or the like around the electric wire protecting member at a plurality of positions in the direction in which the electric wire protecting member extends.

Also, a plurality of electric wires 42 may be accommodated between partition portions 54.

Also, the electric wire protecting member-equipped wire harness 40 can not only be applied to the above-described slide wiring apparatus 30 but also can be used as a member for supporting the plurality of electric wires bendably in one direction while protecting the plurality of electric wires routed in a vehicle.

Note that the configurations described in the above-described embodiment and modifications can be combined as appropriate as long as they do not contradict mutually.

Although this design has been described in detail above, the above description is illustrative in all respects, and this invention is not limited to the above description. It will be understood that numerous modifications not illustrated here can be envisioned without departing from the range of this invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

16 Slide movement member
30 Slide wiring apparatus

32 Harness accommodation portion
40, 140 Electric wire protecting member-equipped wire harness
42 Electric wire
50, 150 Electric wire protecting member
52, 152 Belt-shaped base portion
54 Partition portion
54S Slit
56 Belt-shaped lid portion
56S Lid slit
57S Electric wire accommodation slit

The invention claimed is:

1. An electric wire protecting member-equipped wire harness, comprising:
   an electric wire protecting member for protecting a plurality of electric wires, the electric wire protecting member including:
   a belt-shaped base portion that extends in a belt-shape,
   three or more partition portions that are formed along a direction in which the belt-shaped base portion extends and are provided in parallel to each other at intervals into which the electric wires can be accommodated in a width direction of the belt-shaped base portion, and
   a belt-shaped lid portion for covering openings of the three or more partition portions on the side opposite to the belt-shaped base portion,
   slits for dividing the three or more partition portions being formed at least at one location along the width direction of the belt-shaped base portion,
   lid slits for dividing the belt-shaped lid portion being formed at positions of the belt-shaped lid portion that correspond to the positions of the slits, and
   electric wire accommodation slits extend along a direction in which the belt-shaped lid portion extends being formed at central positions between adjacent partition portions in the three or more partition portions of the belt-shaped lid portion, wherein the electric wire accommodation slits are each defined by two outer edges of the belt-shaped lid portion that each extend perpendicularly from adjacent ones of the three or more partition portions, and wherein the two outer edges each include portions that permit an opening of the electric wire accommodation slits to gradually increase outward, and
   a plurality of electric wires that are accommodated between the three or more partition portions and are lined up in parallel to each other.

2. The electric wire protecting member-equipped wire harness according to claim 1,
   wherein the slits are formed at a plurality of positions in the direction in which the belt-shaped base portion extends.

3. The electric wire protecting member-equipped wire harness according to claim 1,
   wherein a minimum width of accommodation spaces between the three or more partition portions is larger than an outer diameter of the electric wires.

4. A slide wiring apparatus for absorbing an extra length of a wire harness routed between a vehicle body and a slide movement member provided in the vehicle body, the slide wiring apparatus comprising:
   the electric wire protecting member-equipped wire harness according to claim 1, in which one end of the electric wire protecting member is fixed to the vehicle body and another end of the electric wire protecting member is fixed to the slide movement member; and
   a harness accommodation portion for accommodating the electric wire protecting member-equipped wire harness in a state in which the electric wire protecting member-equipped wire harness is bent into a U-shape with the belt-shaped base portion disposed on its inner circumferential side,
   wherein a U-shaped bending form of the electric wire protecting member-equipped wire harness in the harness accommodation portion is changed as the slide movement member moves.

* * * * *